United States Patent [19]

Bonnet et al.

[11] Patent Number: 5,184,289
[45] Date of Patent: Feb. 2, 1993

[54] MAGNETIC CONTROL PROCESS FOR TRANSFERING ENERGY IN A STATIC CONVERTER

[76] Inventors: André Bonnet, Quartier du Clos, 13360 Roquevaire; Jean-Pierre Danner, Chemin des Severiers, 13600 La Ciotat, both of France

[21] Appl. No.: 731,826

[22] Filed: Jul. 15, 1991

[30] Foreign Application Priority Data

Jul. 13, 1990 [CH] Switzerland ............ 2343/90
Mar. 5, 1991 [CH] Switzerland ............ 664/91

[51] Int. Cl.$^5$ ............................... H02M 3/335
[52] U.S. Cl. .......................... 363/20; 363/21; 363/24; 363/25; 363/97
[58] Field of Search ........... 363/20, 21, 24, 25, 363/26, 97, 98

[56] References Cited

U.S. PATENT DOCUMENTS

| | | |
|---|---|---|
| 3,963,973 | 6/1976 | Vermolen . |
| 4,342,075 | 7/1982 | Hiromitsu . |
| 4,652,809 | 3/1987 | Barn ............................ 323/282 |
| 4,736,285 | 4/1988 | Cohen ........................ 363/56 X |
| 4,809,148 | 2/1989 | Barn ........................... 363/56 X |
| 4,864,478 | 9/1989 | Bloom . |
| 4,885,673 | 12/1989 | Philippe ...................... 363/21 |
| 4,922,396 | 5/1990 | Niggemeyer ............... 363/21 |
| 4,951,186 | 8/1990 | Brakus et al. .............. 363/21 |
| 4,969,081 | 11/1990 | Shekhawat et al. ........ 363/56 |

FOREIGN PATENT DOCUMENTS 0191482 8/1986 European Pat. Off. .
0255844 2/1988 European Pat. Off. .

Primary Examiner—Emanuel T. Voeltz
Attorney, Agent, or Firm—Young & Thompson

[57] ABSTRACT

The invention relates to a magnetic control process for transfering energy in a static converter comprising a voltage source (E) and an almost sinusoidal current generator IQS serially coupled with the primary winding of at least one saturable current transformer (TP). The secondary winding of the current transformer (TP) feeds a control circuit (C) which regulates as a function of one parameter, voltage or current, of this secondary winding the demagnetization of the whole magnetic circuit (TP) according to the desired energy transfer. The invention also relates to a static converter for implementing the method.

7 Claims, 7 Drawing Sheets

MAGNETIC CONTROL PROCESS FOR TRANSFERING ENERGY IN A STATIC CONVERTER

BACKGROUND OF THE INVENTION

The present invention relates to a magnetic control process for transferring energy in a static converter. One knows, for example from U.S. Pat. No. 4,342,075 how to drive the power delivered by the secondary winding of a static converter by acting on the leakage flow or the saturation of a transformer. One uses an auxillary magnetic circuit allowing to add, with a control winding, a flow in the principal magnetic circuit which comports the primary and the secondary windings, so that the permeability varies allowing the regulation of the energy transfer between the primary and the secondary windings.

This involves a modification of the magnetic circuit of the transformer and the use of a control winding fed by either a command or a control device acting on the flow of energy.

SUMMARY OF THE INVENTION

The aim of the present invention is to implement a magnetic control process for transferring energy in a static converter which uses neither a command winding nor an auxillary magnetic circuit so that the cost of such static converters will be reduced by using a conventional transformer.

The magnetic control process for transferring energy in a static converter distinguishes itself by the characteristics disclosed and claimed hereafter.

BRIEF DESCRIPTION OF THE DRAWINGS

The attached drawings show schematically and by way of example the principle of the process according to the invention and two methods to implement it.

DETAILED DESCRIPTION OF THE INVENTION

Figure 1:
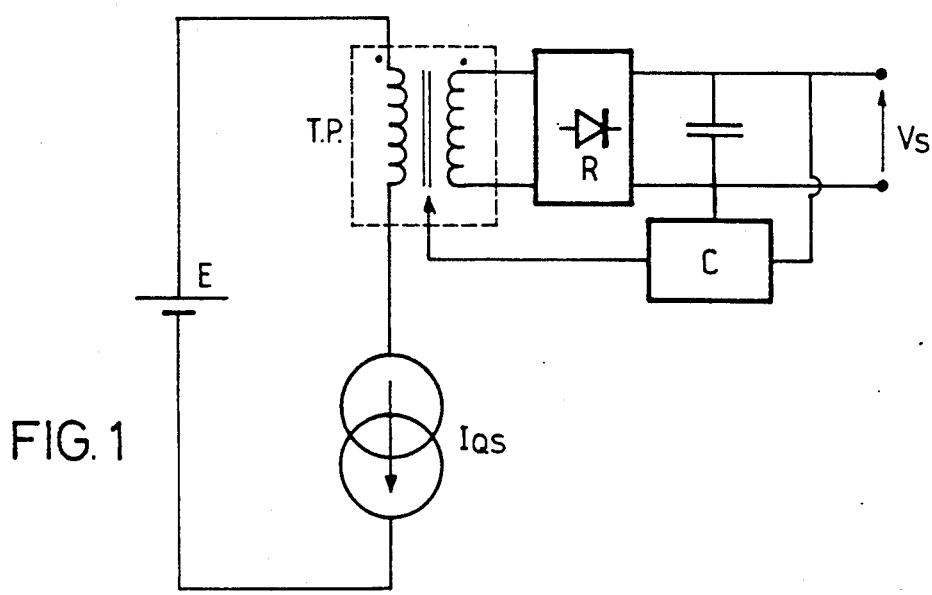
FIG. 1 shows the structure of the principle of the process according to the invention.

FIG. 1 shows the principle structure of the magnetic control process for transferring energy according to the invention.

E. is a voltage supply feeding the circuit. It may be obtained either by rectifying and filtering an alternating power supply or from any continuous energy supply.

IQS is a nearly sinusoidal current source. In the following examples, IQS is based on a series resonance monoswitch structure. This current source IQS feeds the primary winding of the current transformer T.P.

R is either a half or full-wave rectifier.

C is a control circuit for one of the following output parameters, voltage, current or power, which permits to control the magnetic state of the current transformer T.P.

Figure 2:
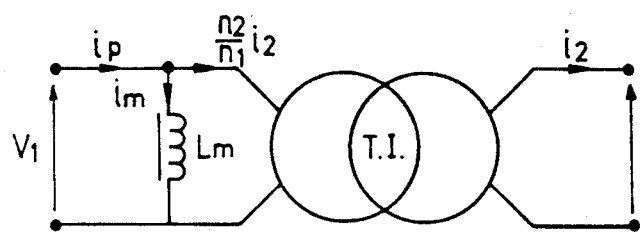
FIG. 2 shows a simplified equivalent model which explains the principle of operation of a current transformer used in the static converter.

In order to explain the operating principle of the static converter according to the invention, one may refer to the simplified equivalent model shown in FIG. 2 in which Lm is the magnetizing inductance and T.I. a perfect current transformer comprising n1 turns on the primary and n2 turns on the secondary winding.

The node law gives:

$$Ip = IM + (I2 \cdot n2/n1)$$

When the magnetic core of the transformer is saturated, Lm is nearly zero and Ip=Im. There is no energy transfer towards the secondary.

When the magnetic core is not saturated, Lm has a determined value such that Im is very small compared to Ip. Then Ip=I2·n2/n1 and the energy is transferred toward the secondary winding.

One should note that the average voltage, during one period, taken at the connectors of the winding of a transformer is equal to zero during a steady state working condition. This is true for any winding with a low resistance, the primary winding, the secondary winding, as well as an auxillary winding.

According to the present process, the control circuit allows the average voltage, taken across connectors of the winding, to vary during transient working condition. In this manner, the magnetic the saturation of the magnetic core by allowing the voltage at the connectors of the primary or secondary winding of the transformer to vary during the transient working condition. According to this process it is no longer necessary to use a magnetic auxillary winding. One can use a conventional current transformer.

One can control the demagnetization of the magnetic core through the minimal value of the magnetizing current Im according to three possibilities:

By regulating the magnitude of the primary or secondary winding voltage during the demagnetization phase.

Under a constant voltage, by regulating the duration of the demagnetization.

By combining the two above described actions.

Figure 3A:
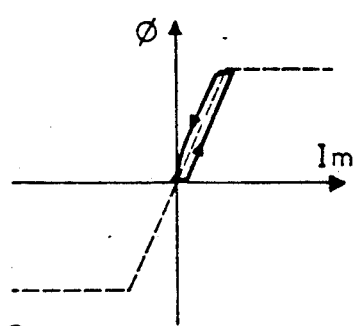
FIG. 3a and 3b are views of the magnetic flow as a function of the magnetizing current, without saturation during one period, respectively with saturation during a part of the period of operation.
Figure 3B:
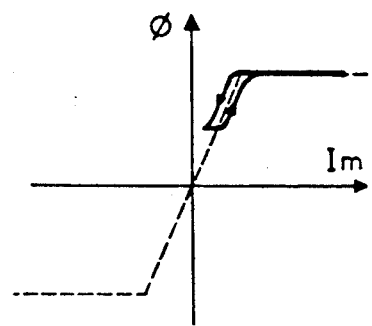

FIGS. 3a and 3b show the magnetic flow $\phi$ as a function of the magnetizing current Im, one can follow the evolution of the magnetic state of the core. During one period, there is no saturation in the example shown at FIG. 3a. There is a saturation during a part of the working period at FIG. 3b.

The regulator C, adjusts at each period, either the demagnetization voltage or the duration of the demagnetization or the best combination of the above parameters in order to obtain the desired energy transfer During each working period, the current transformer is saturated for a time slice depending on the energy to be transmitted to the secondary winding to regulate the desired output parameter.

The current transformer is manufactured in the same way as a conventional transformer, the magnetic circuit has either a toric shape or is composed of parts having a general shape of a U, E or I. The windings may be interleaved or not, concentric or incorporated, mounted either on the same leg of the magnetic core or on different portions.

The current transformer does not include an auxillary control or magnetizing circuit.

Figure 4:
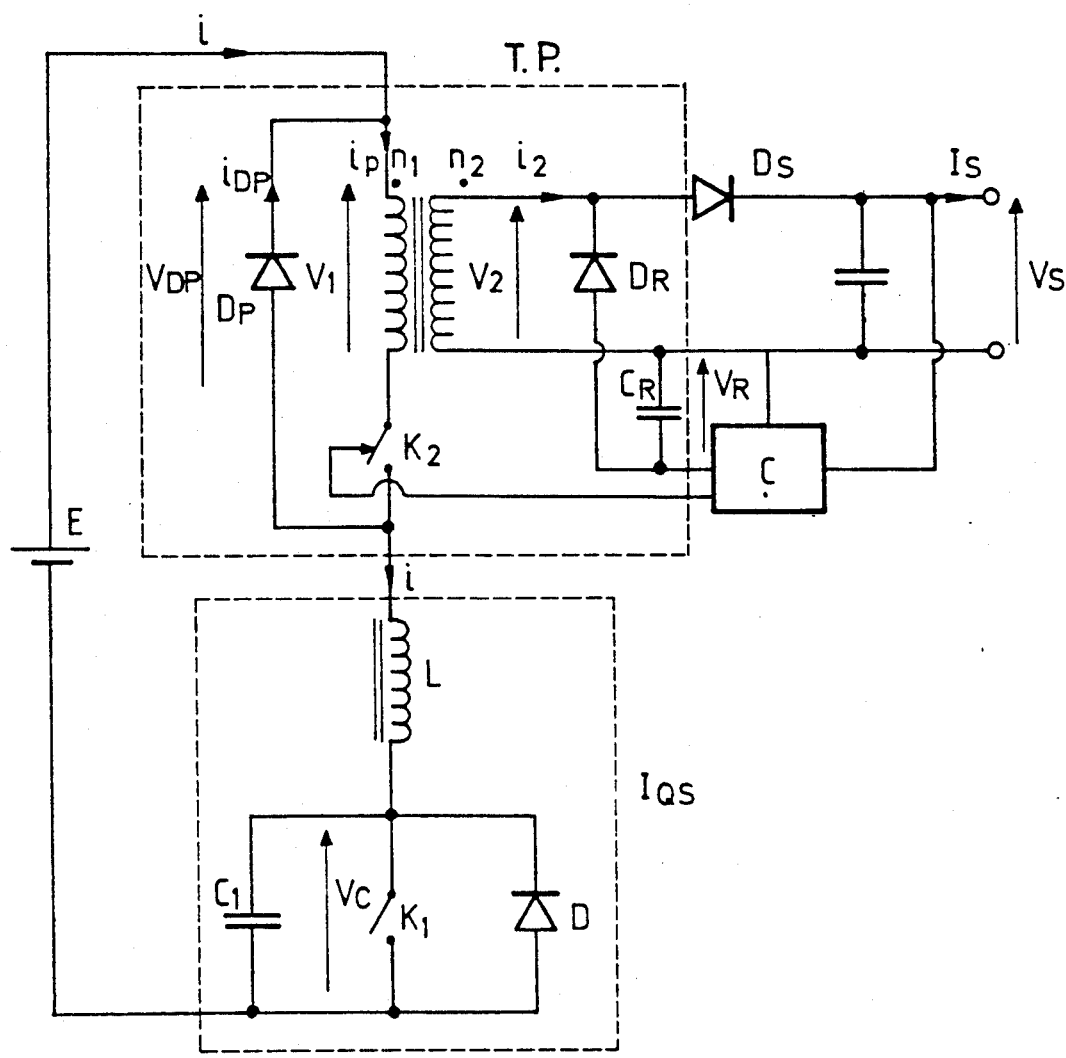
FIG. 4 represents a first embodiment of a static converter implementing the process according to the invention.

FIG. 4 represents a first embodiment of a static converter, the transfer of energy of which being controlled according to the process of the present invention.

The regulation principle used is this example consists of varying the demagnetizing voltage Vr with the assistance of the regulator C.

IQS the nearly sinusoidal current source with a constant amplitude and is made up of components K1, C1, D and L.

K1 is a switch which is open when it reaches a value of I1 determined by the designer during the calibration of the static converter. Then i enters an oscillating phase, becomes negative and then goes through the diode D as soon as the voltage across the capacitor C1 is equal to zero. K1 is closed when i tends to become positive again, and a new period starts. The technology used for K1 may be either MOS, FET or bipolar transistor.

Components K2, Dp, Ds, Dr and C comprise the control circuit which controls the magnetic state of the transformer.

K2 is a switch (any technology may be used) controlled by the regulator C. Its apparent power is very low compared to K1. It is closed when i is positive and open when i is negative.

The current Ip in the primary winding of the transformer can only be positive.

The diode Dp insures the continuity of the current i during its negative swing.

Only one rectifying diode Ds is needed on the secondary winding. When Ip is positive and the transformer is not saturated, Ds conducts.

The diode Dr allows the demagnetization of the magnetic core during the negative swing of the current i, and the switch K2 is then opened.

The control circuit C regulates the value of the demagnetizing voltage Vr under which demagnetization takes place.

Figure 5A:
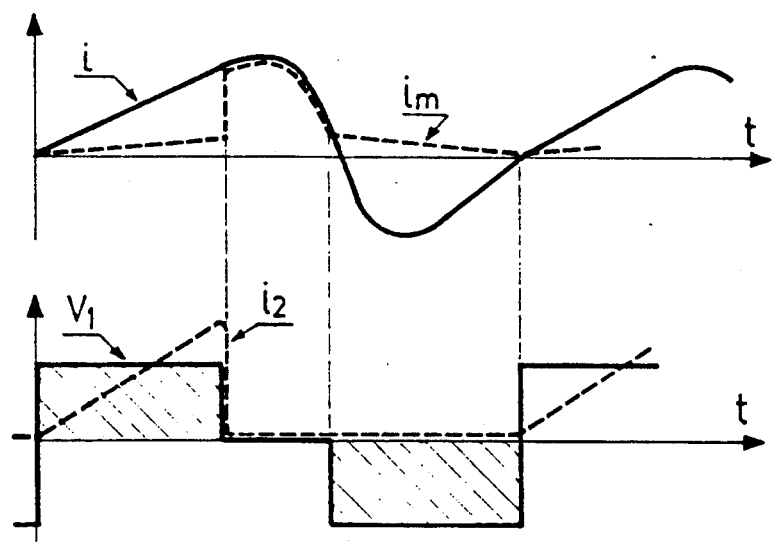
FIGS. 5a and 5b show wave forms with different parameters when the converter illustrated at FIG. 4 is loaded and lightly loaded, respectively.
Figure 5B:
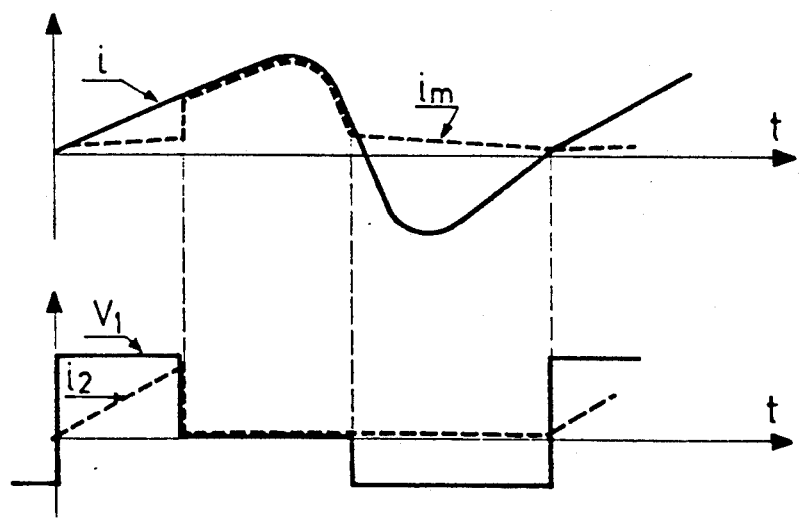

One obtains in this way the wave forms shown in FIG. 5a (loaded converter) and 5b (lightly loaded converter).

Figure 6:
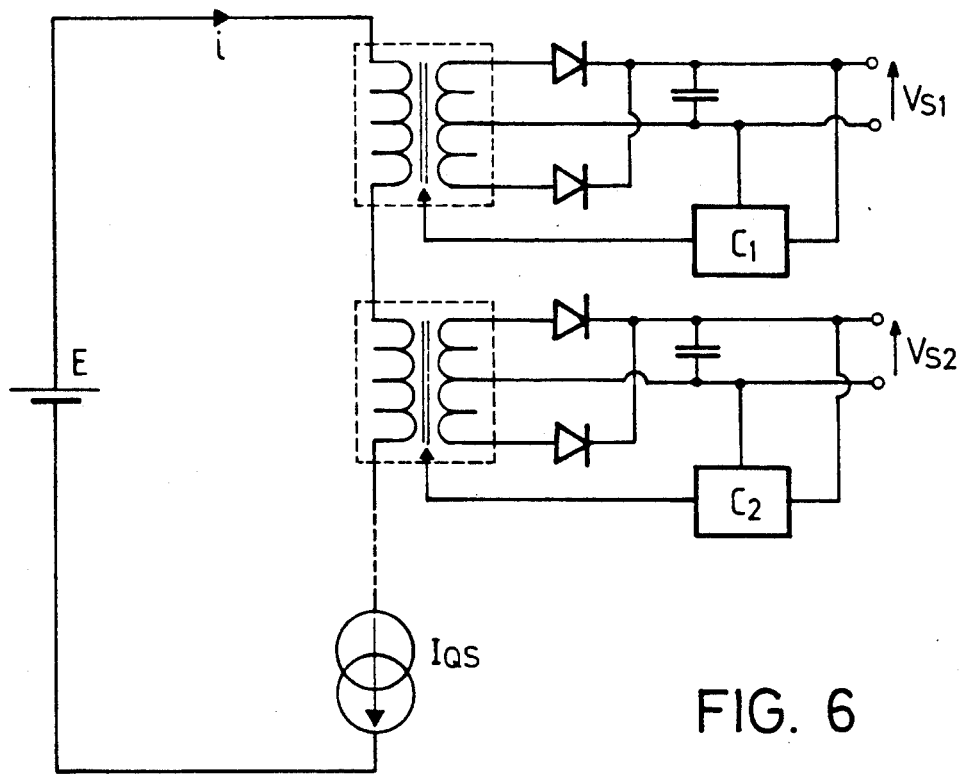
FIG. 6 illustrates an embodiment wherein several transformers are connected in series, each being separately regulated.

One should note that several transformers may be connected in series but separately regulated as shown in FIG. 6.

One sees at FIG. 6 that the primary windings of several current transformers TP1, TP2 . . . are connected in series with the voltage source E and the nearly sinusoidal current source IQS.

The secondary windings of each of these transformers feed a control circuit C1, C2 . . . which controls the demagnetization of the corresponding transformer's magnetic core.

So each of the transformers is regulated according to the control process described in the present invention. It is obvious that each transformer may have several outputs.

One may obtain that way, with a single main switch, a multi-output supply with independent regulation for some of its output.

For example, for a television set, it is possible to regulate in the described series resonance monoswitch structure, on one hand the low voltage supply of the electronic circuits, on the other hand the accelerating and deviating voltages of the plates (T.H.T.) and to respect the isolating distances.

Figure 7A:
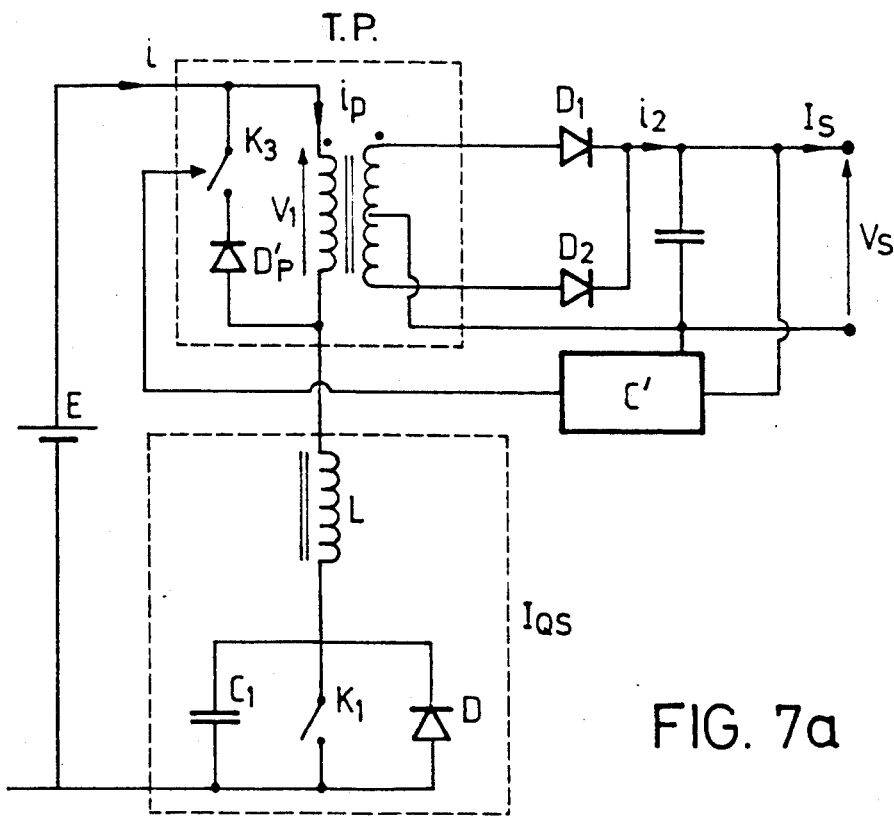
FIG. 7a shows a first variant of a second embodiment of a static converter implementing the process according to the invention.

FIG. 7a shows a first variant of a second embodiment of a static converter implementing the process according to the invention. The regulation principle used in this variant consists of varying the duration of the magnetization phase with a regulator C' which controls on the switch K3.

Components K1, L, C1 and D comprise the current source IQS described in the first embodiment.

The switch K3 connected in parallel with the primary winding of the current transformer T.P. is controlled by the regulator C' during the negative alternance of the current i. When one wants to transfer the maximal power to the output, K3 is always open during the period. As the power decreases, the regulator C' closes the switch K3 during the negative swing of the current i for a duration determined by the desired energy transfer.

When the primary current Ip is positive, the diode D1 conducts if the transformer is not saturated.

When the current Ip is negative, the diode D2 conducts if the switch K3 is open. On the contrary if K3 is closed, the magnetizing current Im has the same amplitude as Ip and the diode d2 is blocked.

Figure 8B:
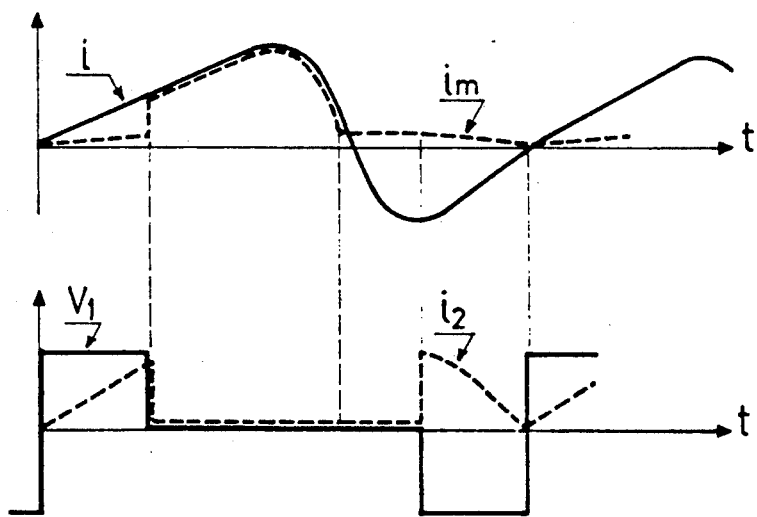
FIGS. 8a and 8b show wave forms with different parameters when the converter illustrated at FIG. 7 is loaded and lightly loaded, respectively.
Figure 8A:
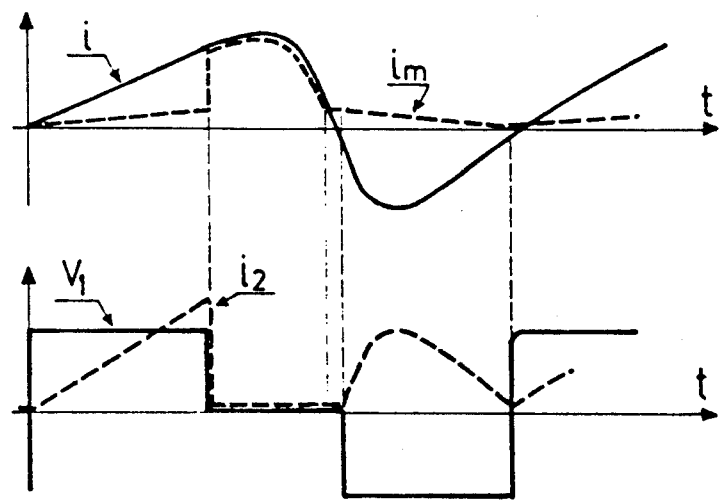

One obtains in this way the wave forms shown at FIG. 8a (loaded converter) and 8b (lightly loaded converter).

Figure 7B:
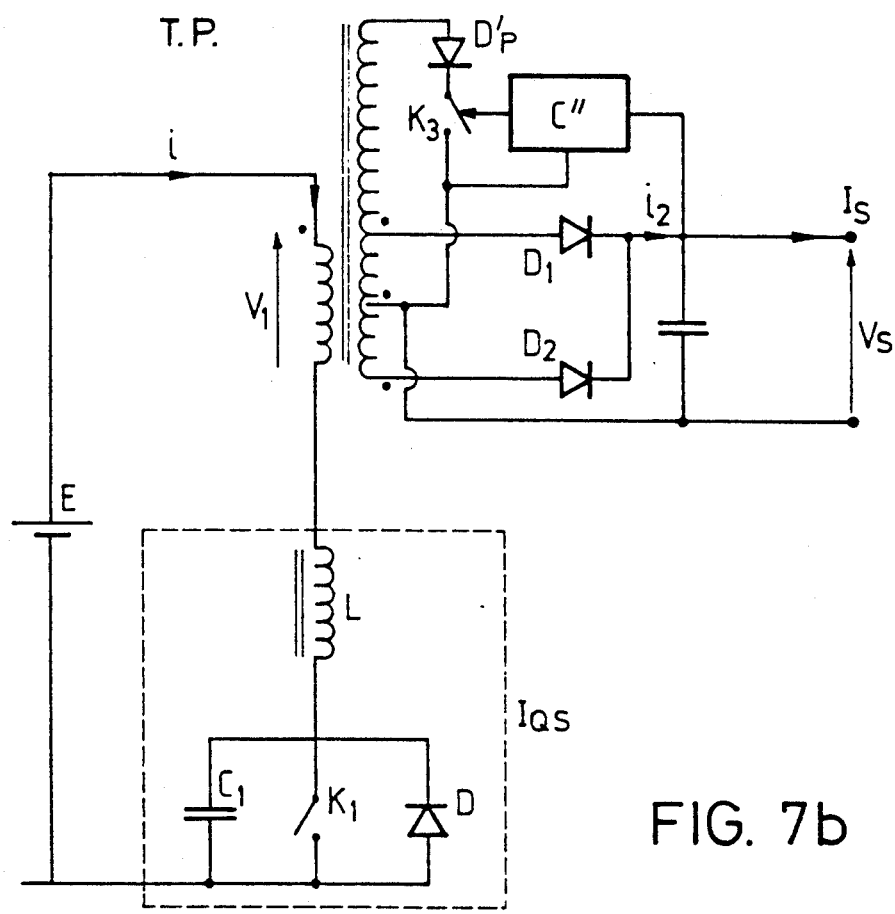
FIG. 7b shows a second variant of a second embodiment of a static converter implementing the process according to the invention.

FIG. 7b shows a second variant of the embodiment of a static converter implementing the control process according to the invention where the switch K3 and the diode D'p are connected in parallel with the secondary winding of the current transformer T.P.

The regulation principle used in this variant consists of varying the duration of the demagnetization phase with a regulator C" acting on the switch K3.

Together K3 and D'p may be connected either on the principal primary or secondary windings of a conventional transformer, or on an auxillary winding of a particular transformer. The choice of the winding on which the regulation acts is a compromise between the current flowing in the switch K3 and regulating the voltage across its connectors.

One should note that in every described of the static converter implementing the control process according to the invention, inductance L which is part of the current source IQS may be integrated in or constitued by the leakage inductance of the current transformer T.P.

Figure 9A:
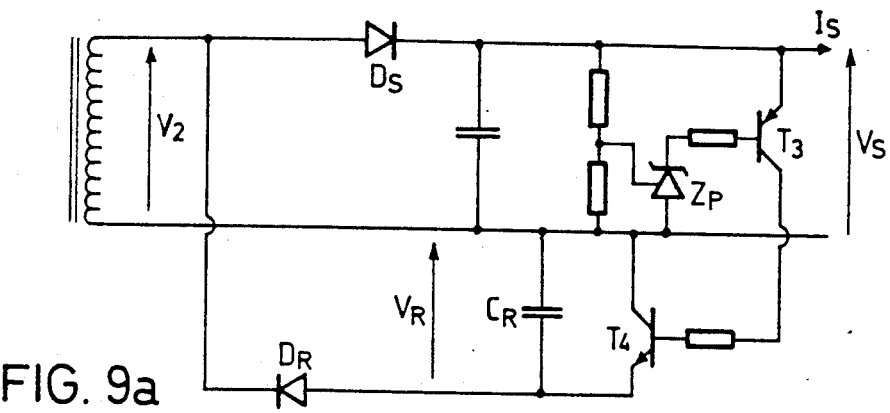
FIGS. 9a, 9b and 9c are block schemes of one execution of the regulation circuits C,C' respectively C" in the embodiments illustrated in FIGS. 4 respectively 7a 7b.

The regulator C shown at FIG. 9a is used in the first embodiment of the static converter represented at FIG. 4. It comprises a diode Dr which carries the demagnetizing energy of the current transformer T.P. and a transistor T4 which dissipates this energy.

When the voltage Vs tends to grow, the transistor T4 conducts and discharges the capacitor CR so that the demagnetizing voltage decreases. The magnetic core tends to saturate. Less energy is then passing through and the voltage Vs tends to decrease. The working point is then stable.

Figure 9B:
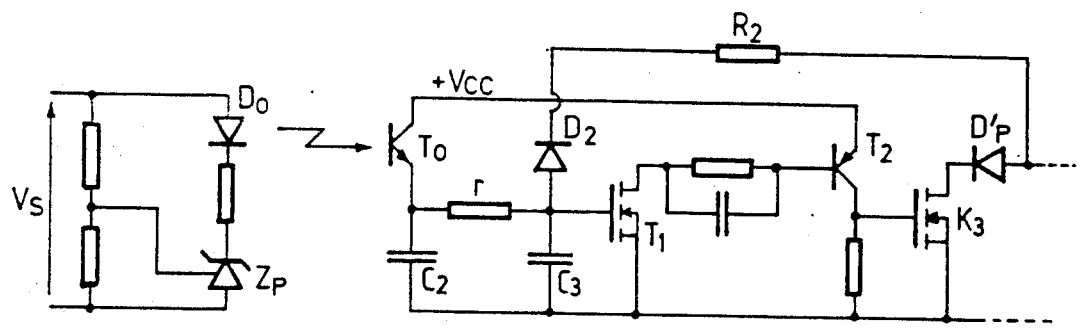

The regulator C' as shown in FIG. 9b is used in the variant of the static converter shown in FIG. 7a. It comprises a reference voltage Vref produced by a programmable Zenner diode Zp. The current in the optocoupler diode Do evolves in the same direction as (Vs−Vref), where Vs is the output voltage of the converter.

The phototransistor To coupled to the diode Do acts as a current source which loads the capacitor C2. C2 is then a voltage source whose amplitude grows with the voltage Vs.

The circuit comprising the following components r, C3, D2 and R2 applies a saw tooth voltage to the grid of the transistor T1 which conducts from its control threshold, generating in this way the saturation of the transistor T2 and the conductivity of the switch K3.

The switch K3 is controlled in sychronization with the switch K1 and its conduction duration is longer, at each period, as the output voltage Vs gets bigger.

Figure 9C:
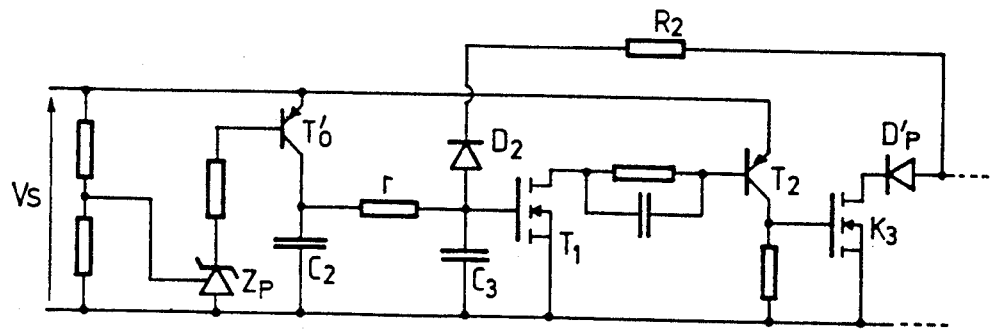

The regulator C'' shown in FIG. 9c is used in the variant of the static converter shown in FIG. 7b, in which the switch K3 and the diode D'p are connected in parallel with the secondary winding of the transformer T.P. In that case one does not need a galvanic insulation. The regulator C'' is then similar to the regulator C'. The optocoupler (To,Do) being replaced by a simple PAP transistor To'.

We claim:

1. A process using the saturation of a transformer magnetic core to control the energy transfer of a static converter having an input and an output, and including at least one transformer having a primary and a secondary winding wound on a magnetic core, said static converter acting as a current source towards said primary winding of said transformer, and comprising the steps of:
    controlling the magnetization state of said transformer magnetic core through a regulation circuit,
    controlling the energy transfer from the input to the output of said static converter by utilizing the controlled magnetization state of said transformer magnetic core to allow energy to be transferred to said output of said static converter without damaging said static converter acting as a current source, when said transformer magnetic core has not been set to a state of saturation by said regulation circuit, and to prevent energy from being transferred to said output of said static converter when said transformer magnetic core has been set to a state of saturation by said regulation circuit.

2. Process as claimed in claim 1, wherein said regulation circuit controls the magnetization state of said transformer magnetic core by modifying, during a transient working condition, the average value of the voltage across any winding of said transformer.

3. Process as claimed in claim 1, wherein said regulation circuit controls a time during which said transformer magnetic core is saturated.

4. Process as claimed in claim 3, wherein said regulation circuit controls the amount of energy transferred from said input to said output of said static converter by varying said time during which said transformer magnetic core is saturated.

5. Process as claimed in claim 1, wherein said static converter is configured in an independent multi-output configuration and includes a plurality of transformers similar to said transformer, said plurality of transformers being connected in series by their said primary windings and the magnetization state of each said transformer magnetic core being independently controlled by a particular regulation circuit which modifies, during a transient working condition, the average value of the voltage across any said winding of each said transformer according to a desired energy transfer across said transformers to corresponding independent outputs of said static converter.

6. In a static converter including a voltage source (E), at least one transformer having a primary winding and a secondary winding wound on a magnetic core; the improvement wherein said static converter has a topology such that said static converter is configured as a current source (IQS) towards the primary winding of said transformer (TP), one winding of said transformer (TP) being controlled by a regulation circuit (C), said regulation circuit controlling the magnetization state of said transformer magnetic core according to a predetermined energy transfer.

7. Static converter according to claim 6, wherein said static converter is configured in an independent multi-output configuration, and includes a plurality of transformers, said transformers are connected in series by their primary windings, and a magnetization state of each said transformer magnetic core is independently controlled by a particular regulation circuit which modifies, during a transient working condition, an average value of a voltage across said secondary windings of each said transformers according to a predetermined energy transfer across said transformers to corresponding independent outputs of said static converter.

* * * * *